US010211933B2

(12) United States Patent
Mishra et al.

(10) Patent No.: US 10,211,933 B2
(45) Date of Patent: Feb. 19, 2019

(54) METHOD OF CLASSIFYING INTERFERERS IN CO-CHANNEL INTERFERENCE BY COMMUNICATION DEVICE

(71) Applicant: Samsung Electronics Co., Ltd., Suwon-si, Gyeonggi-do (KR)

(72) Inventors: Samir Kumar Mishra, Bangalore (IN); Prince Arya, Bangalore (IN); Uma Kishore Satya Venkata Godavarti, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 10 days.

(21) Appl. No.: 15/496,584

(22) Filed: Apr. 25, 2017

(65) Prior Publication Data

US 2018/0115374 A1  Apr. 26, 2018

(30) Foreign Application Priority Data

May 19, 2016 (IN) .............................. 201641017316
Oct. 25, 2016 (IN) .............................. 201641017316

(51) Int. Cl.
*H04B 17/336* (2015.01)
*H04B 17/345* (2015.01)
*H04L 5/00* (2006.01)

(52) U.S. Cl.
CPC ......... *H04B 17/345* (2015.01); *H04B 17/336* (2015.01); *H04L 5/0048* (2013.01)

(58) Field of Classification Search
CPC ................ H04B 17/345; H04B 1/7107; H04B 2201/709709; H04B 15/00; H04B 17/336; H04B 1/1036; H04B 1/71072; H04B 2201/70701; H04B 7/0626; H04B 7/0634; H04W 72/082; H04J 11/0023; H04J 11/005; H04J 11/0026
See application file for complete search history.

(56) References Cited

U.S. PATENT DOCUMENTS

| | | | |
|---|---|---|---|
| 7,379,724 B2 | 5/2008 | Nilsson et al. | |
| 7,801,248 B2 | 9/2010 | Challa et al. | |
| 7,933,256 B2 | 4/2011 | Abrishamkar et al. | |
| 8,605,838 B2 | 12/2013 | Molnar et al. | |
| 8,855,000 B2 | 10/2014 | Mallik et al. | |
| 2002/0137485 A1 | 9/2002 | Nilsson et al. | |

(Continued)

*Primary Examiner* — Mohamed A Kamara
(74) *Attorney, Agent, or Firm* — Harness, Dickey & Pierce, P.L.C.

(57) ABSTRACT

A method of classifying one or more interferers in a Co-Channel Interference (CCI) by a communication device including receiving, by a receiver, an in-phase and quadrature (IQ) symbol and a pilot symbol, generating, by an eigenvalue generator, eigenvalues in accordance with the received IQ symbol and the pilot symbol, computing, by an Signal To Interference Plus Noise Ratio (SINR) calculator, a SINR from the IQ symbol and the pilot symbol, and classifying, by an interferer classifier, the one or more interferers into one of a single interferer or multiple interferers based on the generated eigenvalues and the computed SINR may be provided. The method may be independent of underlying modulation scheme and Radio Access Technology (RAT) and improve a receiver of the communication device performance by at least 1.2 dB.

20 Claims, 9 Drawing Sheets

(56) References Cited

U.S. PATENT DOCUMENTS

| | | | |
|---|---|---|---|
| 2005/0095985 A1* | 5/2005 | Hafeoz | H04L 25/03178 |
| | | | 455/67.11 |
| 2010/0067366 A1 | 3/2010 | Nicoli | |
| 2013/0142113 A1* | 6/2013 | Fong | H04W 4/70 |
| | | | 370/328 |
| 2015/0098440 A1 | 4/2015 | Yang et al. | |
| 2017/0147940 A1* | 5/2017 | Mitola, III | G06N 99/005 |
| 2017/0250716 A1* | 8/2017 | Kinget | H04B 1/1036 |

* cited by examiner

METHOD OF CLASSIFYING INTERFERERS IN CO-CHANNEL INTERFERENCE BY COMMUNICATION DEVICE

PRIORITY

This application claims priority under 35 U.S.C. § 119(a) to Indian Provisional Patent Application Serial No. 201641017316 (PS), which was filed on May 19, 2016 in the Indian Intellectual Property Office, and to Indian Complete Patent Application Serial No. 201641017316 (CS), which was filed on Oct. 25, 2016 in the Indian Intellectual Property Office, the entire disclosure of each of these applications is incorporated herein by reference.

BACKGROUND

The demand for resource in wireless communication systems is immense. The lack of resource leads network operators to choose solutions with denser network deployments in technologies like Global System for Mobile communication (GSM) technology, Universal Mobile Telecommunications System (UMTS) technology or heterogeneous architectures in technologies like Long-Term Evolution (LTE) technology, and LTE advanced (LTE-A) technology where a macro-cell serves a larger area and a micro cell, a pico-cell or a femto-cell is used to increase coverage in hotspots. However, such technologies have led to reduction in a frequency re-use ratio, and hence a User Equipment (UE) suffers interference from neighboring cells on a same downlink frequency as a serving cell, thereby causing Co-Channel Interference (CCI), e.g., unwanted transmission from a neighboring cell. The CCI tends to severely degrade performance of the communication device in the downlink.

The CCI suppression is one of serious challenges in the wireless communication systems because in most of the cases there is no prior information about the occurrence of CCI in the downlink. In order to suppress the CCI in the communication device, various approaches have been proposed in existing mechanisms. For example, a Single Antenna Interference Cancellation (SAIC) in the GSM and an Interference Whitening Filter (IWF) in a Multiple Input, Multiple Output-Orthogonal Frequency Division Multiplexing (MIMO-OFDM) system (e.g., LTE) have been provided to suppress the CCI. For example, Enhanced Inter-Cell Interference Coordination (eICIC) in the LTE-A has been proposed as a technique to avoid interference. However, the behavior of the interference cancellation techniques is dependent on number of co-channel interferers in the downlink at a certain point of time. Further, the performance of the interference avoidance techniques is greatly limited by a bandwidth of a backhaul. There is no signaling about the downlink co-channel interference in any Radio Access Technologies (RAT). Hence, irrespective of the nature and density of interferers, the communication device tries to suppress interference in same manner, thereby leading to degradation of performance. Interference suppression techniques for RAT generally consist of an interference suppression filter, which filters out the co-channel interference from the received downlink signal. Further, such interference suppression filter should be switched off in absence of interference to avoid performance degradation.

The above information is presented as background information only to help the reader to understand the present inventive concepts. Applicants have made no determination and make no assertion as to whether any of the above might be applicable as Prior Art with regard to the present application.

SUMMARY

Some example embodiments herein relate to methods of classifying interferers in a Co-channel Interference (CCI) by a communication device.

Some example embodiments herein relate to methods for detecting the interferers in an interference scenario in the communication device.

Some example embodiments herein relate to methods for receiving an in-phase and quadrature (IQ) symbol and a pilot symbol.

Some example embodiments herein relate to methods for generating eigenvalues in accordance with the received IQ symbol and the pilot symbol.

Some example embodiments herein relate to methods for computing a Signal to Interference Plus Noise Ratio (SINR) from the IQ symbol and the pilot symbol.

Some example embodiments herein relate to methods for classifying one or more interferers into one of a single interferer or multiple interferers based on the generated eigenvalues and the computed SINR.

According to an example embodiment, a method of classifying one or more interferers in a Co-Channel Interference (CCI) by a communication device including receiving, by a receiver, an in-phase and quadrature (IQ) symbol and a pilot symbol, generating, by an eigenvalue generator, eigenvalues in accordance with the received IQ symbol and the pilot symbol, computing, by an Signal To Interference Plus Noise Ratio (SINR) calculator, a SINR from the IQ symbol and the pilot symbol, and classifying, by an interferer classifier, the one or more interferers into one of a single interferer or multiple interferers based on the generated eigenvalues and the computed SINR may be provided.

According to an example embodiment, a communication device of classifying one or more interferers in a Co-Channel Interference (CCI) may include a receiver configured to receive an in-phase and quadrature (IQ) symbol and a pilot symbol, an eigenvalue generator configured to generate eigenvalues in accordance with the received IQ symbol and the pilot symbol, an Signal To Interference Plus Noise Ratio (SINR) calculator configured to compute a SINR from the IQ symbol and the pilot symbol, and an interferer classifier configured to classify the one or more interferers into one of a single interferer or multiple interferers based on the generated eigenvalues and the computed SINR.

According to an example embodiment, a method of adaptively suppressing Co-Channel Interference (CCI) in a communication device may include receiving, by a receiver, an in-phase and quadrature (IQ) symbol and a pilot symbol, generating, by an eigenvalue generator, eigenvalues in accordance with the received IQ symbol and the pilot symbol, computing, by an Signal To Interference Plus Noise Ratio (SINR) calculator, a SINR from the IQ symbol and the pilot symbol, classifying, by an interferer classifier, one or more interferers into one of a single interferer or multiple interferers based on the generated eigenvalues and the computed SINR, and suppressing, by a suppressor, the CCI.

These and other aspects of the example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of example embodiments without departing from the spirit thereof, and example embodiments of the present inventive concepts include all such modifications.

BRIEF DESCRIPTION OF THE DRAWINGS

Some example embodiments are illustrated in the accompanying drawings, throughout which like reference letters indicate corresponding parts in the various figures. The example embodiments herein will be better understood from the following description with reference to the drawings, in which.

DETAILED DESCRIPTION

Figure 1A:
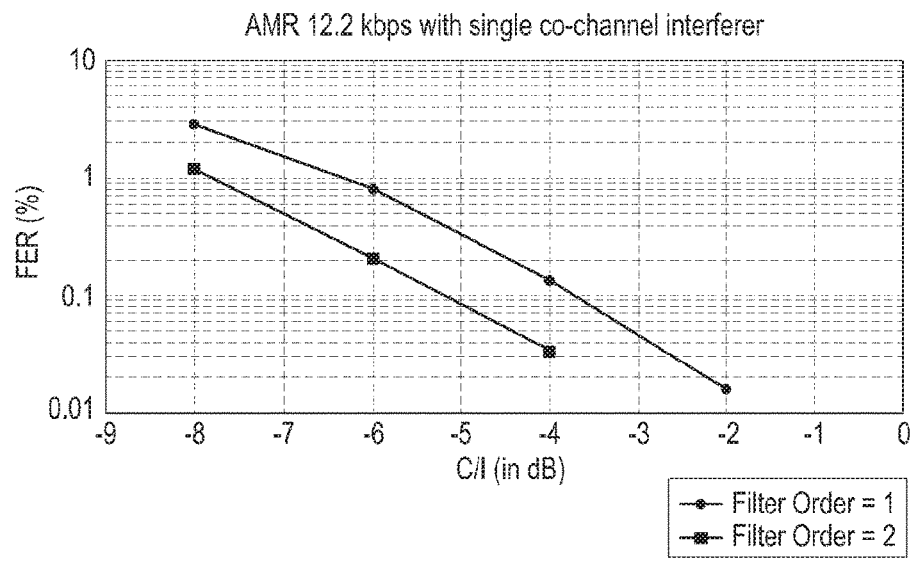
FIG. 1A is a graph illustrating a Frame Erasure Rate (FER) curves for Adaptive Multi-Rate (AMR) 12.2 kbps speech in presence of single co-channel interferer, according to a related art.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which the example embodiments herein can be practiced by those skilled in the art. Accordingly, the disclosed example embodiment should not be construed as limiting the scope of example embodiments herein.

The example embodiments disclosed herein may provide methods of classifying interferers in a CCI by a communication device. The method may include receiving, by a receiver, an in-phase and quadrature (IQ) symbol and a pilot symbol. Further, the method may include generating, by an eigenvalue generator, eigenvalues in accordance with the received IQ symbol and the pilot symbol. Further, the method may include computing, by a Signal To Interference Plus Noise Ratio (SINR) calculator, a SINR from the IQ symbol and the pilot symbol. Furthermore, the method may include classifying, by an interferer classifier, the interferers into one of single co-channel interferer or multiple co-channel interferers based on the generated eigenvalues and the computed SINR. In the example embodiments, the term 'interferer' may comprise an interference signal which can causes interference or disruption in communication systems.

Unlike the conventional methods, the proposed methods can be used to design an adaptive mechanism. The adaptive mechanism can provide information about a number of interferers. In the proposed methods, the order of an interference suppression filter can be decided based on the number of interferers.

The proposed methods can be used to adaptively suppress the CCI in the communication device. The proposed methods may adapt a number of interference suppression filter taps and channel estimator taps based on the number of co-channel interferers. The proposed methods can be used to adaptively suppress the CCI by using a polynomial classifier scheme. The polynomial classifier scheme may be driven using an Eigen values of a mean square error covariance matrix and a measured SINR. Furthermore, the parameters derived can also be considered for enhanced channel state information (CSI). The polynomial classifier scheme may be approximated by a piecewise linear classifier, which has substantially reduced complexity.

The proposed methods may provide an interference cancellation scheme to identify the information about the number of interferers. Such methods may enable the communication device to have improved performance even in extreme CCI conditions irrespective of the number of interferers. The interference cancellation scheme may be held valid regardless of modulation or multiplexing scheme. The proposed methods may allow the communication device to perform better in different mobility scenarios where conditions of the interferers vary frequently. The proposed methods may classify the interferers in the CCI in the highly dense networks, thus improving the performance of the communication device.

The proposed methods may provide a simple polynomial based classifier scheme to more accurately distinguish between single and multiple co-channel interference scenarios.

The proposed methods may be independent of underlying modulation scheme and Radio Access Technology (RAT) and may improve receiver performance by at least 1.2 dB. The proposed methods may be useful for interference density estimation in the $5^{th}$ Generation (5G) communications.

Referring now to the drawings, and more particularly to FIGS. 1a through 10, some example embodiments will be explained.

Figure 1B:
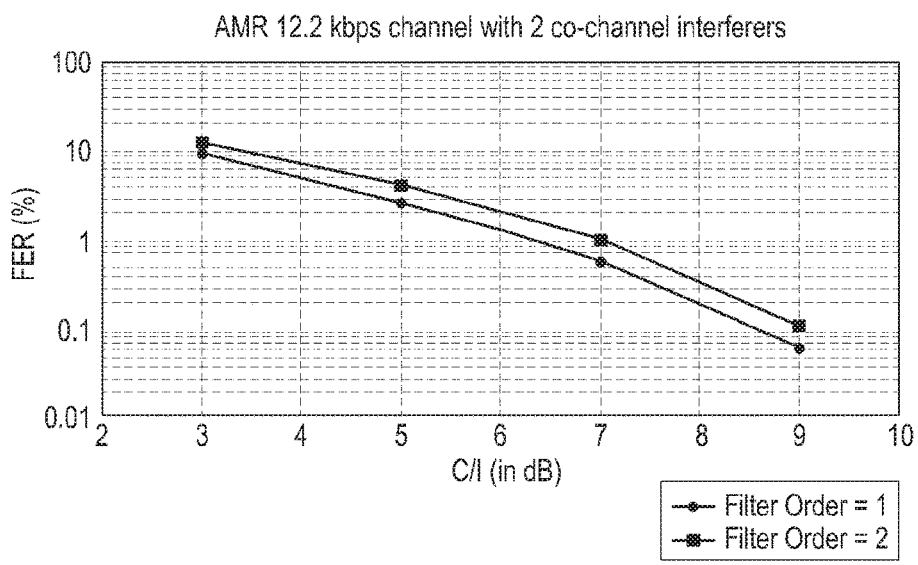
FIG. 1B is a graph illustrating the FER curve for the AMR 12.2 kbps speech in presence of two co-channel interferers, according to a related art.

FIG. 1A is a graph illustrating a FER curve for AMR 12.2 kbps speech in presence of the single co-channel interferer, according to a related art. FIG. 1B is a graph illustrating the FER curve for the AMR 12.2 kbps speech in presence of two co-channel interferers, according to a related art. The FIG. 1A and FIG. 1B show FER performances of a receiver of the communication device (not shown) moving at 50 km/h under the assumption of Rayleigh fading and having single and two co-channel interferers, respectively. Here, the chosen reference point of performance comparison is 1% FER. An interference suppression filter of higher order may enhance performance by about 2 dB when a single co-channel interferer is present (as shown in the FIG. 1A). However, if more than one co-channel interferers are present, a higher order interference suppression filter may degrade performance by about 1 dB as compared to the filter of lower order because of over-fitting. A higher order interference suppression filter tends to over-fit a training sequence or pilot symbols. In a fast fading scenario, the higher order interference suppression filter may not be able describe the channel for an entire set of received data symbols accurately. Thus, although the receiver has a lesser Mean Square Error (MSE) on training, it has more frame erasure or block errors.

Thus, behaviors of interference cancellation algorithms are highly dependent on the current number of co-channel interferers in the downlink as evident from FIG. 1A and FIG. 1B. Therefore, it is desired to detect interference and distinguish between the presence of the single or multiple co-channel interferers for the communication device to better perform in interference scenarios.

SIGNAL MODEL: Suppose that at time t, received signal is x(t), channel impulse response is h(t) and the noise is n(t). The received signal model at a baseband for a part corresponding to pilot symbol or training sequence s can be expressed as follows:

$$X = sH + n \quad (1)$$

$$X_{\{1,K+1\}} := [\, x(t) \ \ x(t-1) \ \ \ldots \ \ x(t-K) \,] \quad (2)$$

$$s_{\{1,K+L\}} := [\, s(t) \ \ s(t-1) \ \ \ldots \ \ s(t-K-L+1) \,] \quad (3)$$

$$n_{\{1,K+1\}} := [\, n(t) \ \ n(t-1) \ \ \ldots \ \ n(t-K) \,] \quad (4)$$

$$H_{\{K+L,K+1\}} := \begin{bmatrix} h(0) & 0 & 0 & \ldots & 0 \\ \vdots & h(0) & 0 & \ldots & \vdots \\ h(L-1) & \vdots & & & \\ 0 & h(L-1) & & & h(0) \\ \vdots & \vdots & h(L-1) & & \vdots \\ 0 & 0 & 0 & & h(L-1) \end{bmatrix} \quad (5)$$

where L is the number of channel impulse response taps and K is the interference rejection filter order. By stacking R samples together, the method obtains the matrix form of (1), which can be express as:

$$\overline{X} = \overline{S}H + \overline{N} \quad (6)$$

$$\overline{X}_{\{R,K+1\}} := \begin{bmatrix} x(t) & x(t-1) & \ldots & x(t-K) \\ x(t+1) & x(t) & \ldots & x(t-K+1) \\ \vdots & \vdots & \ddots & \vdots \\ x(t+R-1) & x(t+R-2) & \ldots & x(t-K+R-1) \end{bmatrix} \quad (7)$$

The matrix $\overline{S}$ may be defined as:

$$\overline{S}_{\{R,K+L\}} := \begin{bmatrix} s(t) & s(t-1) & \ldots & s(t-K-L+1) \\ s(t+1) & s(t) & \ldots & s(t-K-L+2) \\ \vdots & \vdots & \ddots & \vdots \\ s(t+R-1) & s(t+R-2) & \ldots & s(t-K-L+R) \end{bmatrix} \quad (8)$$

where $\overline{X}$ is passed through an interference rejection pre-filter w where w is defined as $$w = [w_0, w_1, \ldots, w_K]^T \quad (9)$$

Thus, the method may obtain $\overline{X}w$ the interference suppressed signal as:

$$\overline{X}w = \overline{S}Hw + \overline{N}w = \overline{S}h + n \quad (10)$$

Interference suppression tends to have a constrained optimization problem (e.g., challenges in estimating the filter w and overall channel h jointly).

Derivation of Error Covariance Matrix:

To obtain the optimum filter coefficient w and estimated channel impulse response h, Signal to Noise Ratio (SNR) maximization is taken into consideration. From equation (10) SNR may be:

$$SNR = \frac{\|\overline{S}h\|^2}{\|\overline{X}w - \overline{S}h\|^2} = \quad (11)$$

$$\frac{h^H R_{SS} h}{w^H R_{XX} w - w^H R_{XS} h - h^H R_{SX} w + h^H R_{SS} h} = \frac{h^H R_{SS} h}{J}$$

Here, J is short form for the denominator. Here J is a convex function. $R_{SS}$ is auto-correlation of matrix $\overline{S}$, $R_{SX}$ is ($\overline{S}^H \overline{X}$), i.e. cross-correlation matrix of $\overline{S}$ and $\overline{X}$, $R_{XX}$ is ($\overline{X}^H \overline{X}$) and $R_{XS}$ is ($\overline{X}^H \overline{S}$). This is a joint optimization problem for separate variables and it can be changed into a constraint optimization problem as $$\mathrm{argmax}_{w,h}(SNR) = \mathrm{argmin}_{w,h}(J) \quad (12)$$

$$s.t. h^T R_{SS} h = I \quad (13)$$

To solve the equation (12) with the constraint as expressed in equation (13), the method utilizes a separation of variables. First, J may be partially differentiated with respect to w.

$$\frac{\partial J}{\partial w} = 2R_{XX} w - 2R_{XS} h = 0 \quad (14)$$

From equation (14), the optimal filter coefficients w may be expressed as:

$$w = R_{XX}^{-1} R_{XS} h \quad (15)$$

By substituting optimal filter coefficient w in equation (12), the method may obtain $\overline{J_W}$, e.g., cost function minimum with respect to w as:

$$\overline{J_W} = h^H (R_{SS} - R_{SX} R_{XX}^{-1} R_{XS}) h \quad (16)$$

Now, the method may utilize the constraint equation (13) using Lagrange multiplier $\lambda$ and may form the equation to estimate h as $$\mathrm{argmin}_h(\overline{J_W}) = h^H (R_{SS} - R_{SX} R_{XX}^{-1} R_{XS}) h + \lambda (I - h^H R_{SS} h) \quad (17)$$

The cost function $\bar{J}_W$ may be differentiated with respect to the estimated channel impulse response h.

$$\frac{\partial \bar{J}_W}{\partial h} = 2(R_{SS} - R_{SX}R_{XX}^{-1}R_{XS})h - 2\lambda(R_{SS}h) = 0 \quad (18)$$

The equation (18) may have a form of generalized eigenvalue problem $$(R_{SS} - R_{SX}R_{XX}^{-}R_{XS})h = \lambda(R_{SS}h) \quad (19)$$

Therefore, the method can drive the several channel estimates $h_i$ according to the matrix dimension of the generalized eigenvalue problem $$h_i = \frac{v_i}{\sqrt{\lambda_i}} \quad (20)$$

where $\lambda_i$ is an eigenvalue and $v_i$ is an eigenvector corresponding to the eigenvalue. If $R_{SS} - R_{SX}R_{XX}^{-1}R_{XS}$ is assumed to be an error covariance matrix P and the least square estimate of S given X is given by $$\bar{y} := (X^H X)^{-1} X^H S \quad (21)$$

Then, error covariance matrix P can also be expressed as:

$$\bar{P} := R_{SS} - R_{SX}\bar{y} \quad (22)$$

The equation (22) avoids direct computation of matrix correlation $R_{XX}$ and its inverse $R_{XX}^{-1}$. Further, in many real-world systems, the pilot symbols are designed to have almost zero auto-correlation at all non-zero lags. Thus, the matrix $R_{SS}$ can be approximated as an identity matrix, i.e. $R_{SS} \approx kI$ where k is a constant. This approximation converts the generalized eigenvalue problem of equation (19) to a simple eigenvalue problem. Here, $\bar{P}$ is a positive semi-definite random matrix.

Estimating Number of Interferers:

The conventional method utilizes an enhanced interference suppression scheme. The enhanced interference suppression scheme can adaptively vary the number of pre-filter taps and the channel taps depending on the number of interferers. The problem of interference density estimation may depend on the error covariance matrix $\bar{P}$, which is expressed by equation (22). $\bar{P}$ is a positive semi-definite random matrix of dimension L×L. Hence, there are L eigenvalues, e.g., $\lambda_1, \lambda_2, \ldots, \lambda_L$.

Figure 2A:
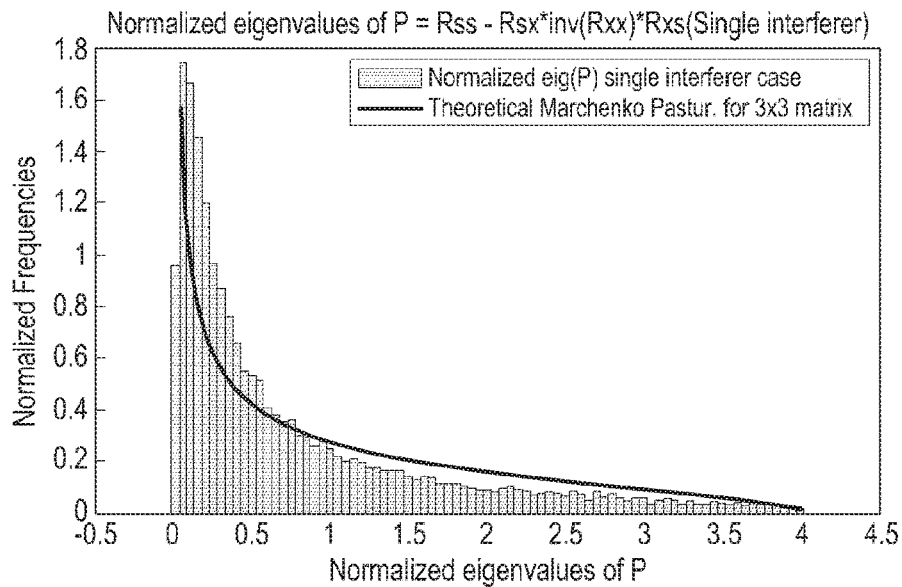
FIG. 2A is a graph illustrating a probability distribution functions (PDF) of normalized Eigenvalues of P for a single interferer scenario, according to a related art.

When a single interferer is present in the wireless communication system, the eigenvalues of $\bar{P}$ may follow Marchenko-Pastur distribution, as shown in FIG. 2A.

Considering that $\lambda$ is the eigenvalue, the Marchenko-Pastur probability distribution function f($\lambda$) for the eigenvalues of $\bar{P}$ can be expressed as $$f(\lambda) = \frac{\sqrt{(\lambda - a)(b - \lambda)}}{2\pi\lambda r} \quad (23)$$

where [a, b] denote the bounded interval in which eigenvalues are distributed, r is the ratio between the number of rows and columns of $\bar{P}$. In this case r=1.

Figure 2B:
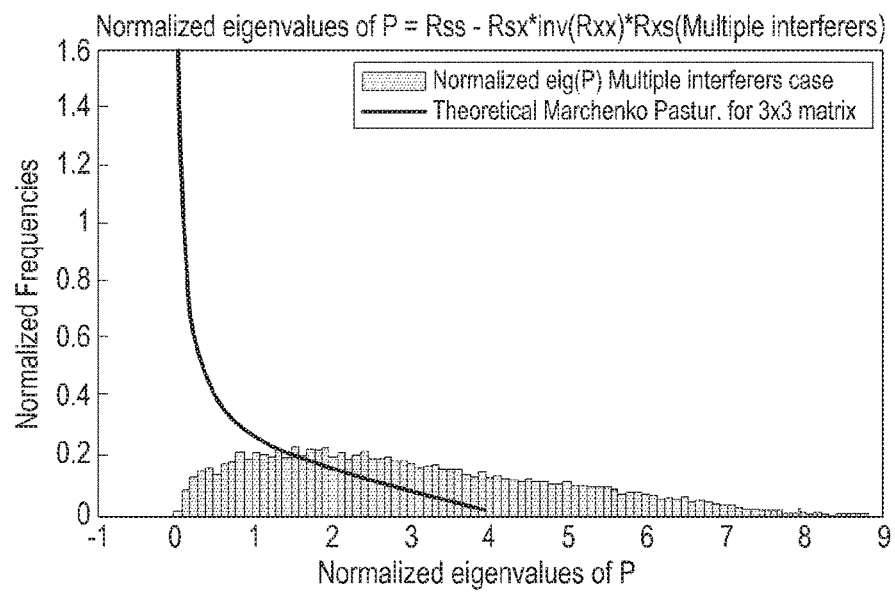
FIG. 2B is a graph illustrating a PDF of normalized eigenvalues of $\overline{P}$ for a multiple interferers scenario, according to a related art.

However, when more interferers are added into the communication system, the eigenvalues of $\bar{P}$ may deviate from the distribution equation (23), as illustrated in FIG. 2B. This deviation in the probability distribution may differentiate between single interferer and multiple interferers scenarios and a classifier may be proposed for the deviation in the probability distribution. One of the parameters for the classifier may be chosen as the minimum eigenvalue because its probability distribution functions (PDF) overlap the least.

$$\lambda_{min} := \min(\lambda_1, \lambda_2, \ldots, \lambda_L) \quad (24)$$

When an interferer is not present and the noise power is very low, the SINR may be high and eigenvalues of $\bar{P}$ may be very small. The correlation may be also negligible because of white noise (AWGN). When a single co-channel interferer is present, there may be some added noise. Hence, the eigenvalues of $\bar{P}$ may be larger than the eigenvalues of $\bar{P}$ in the no interferer scenario.

As more and more co-channel interferers are added, the extra noise may further increase of eigenvalues $\bar{P}$. This impact may become more prominent in the higher dimensions like second ($R^2$) or third ($R^3$). So, in the method of obtaining a proper distinction between a single interferer scenario and a multiple interferers scenario, minimum eigenvalue may be selected. The deviation in the distribution in eigenvalues $\bar{P}$ along with the increase of normalized values thereof may differentiate between single co-channel interferer and multiple co-channel interferers scenarios.

Although the minimum eigenvalue of the error covariance matrix $\bar{P}$ is much lesser in case of the single co-channel interferer scenario than in case of a multiple co-channel interferers scenario, the probability distribution of the eigenvalues may drift as the SINR varies.

Figure 3:
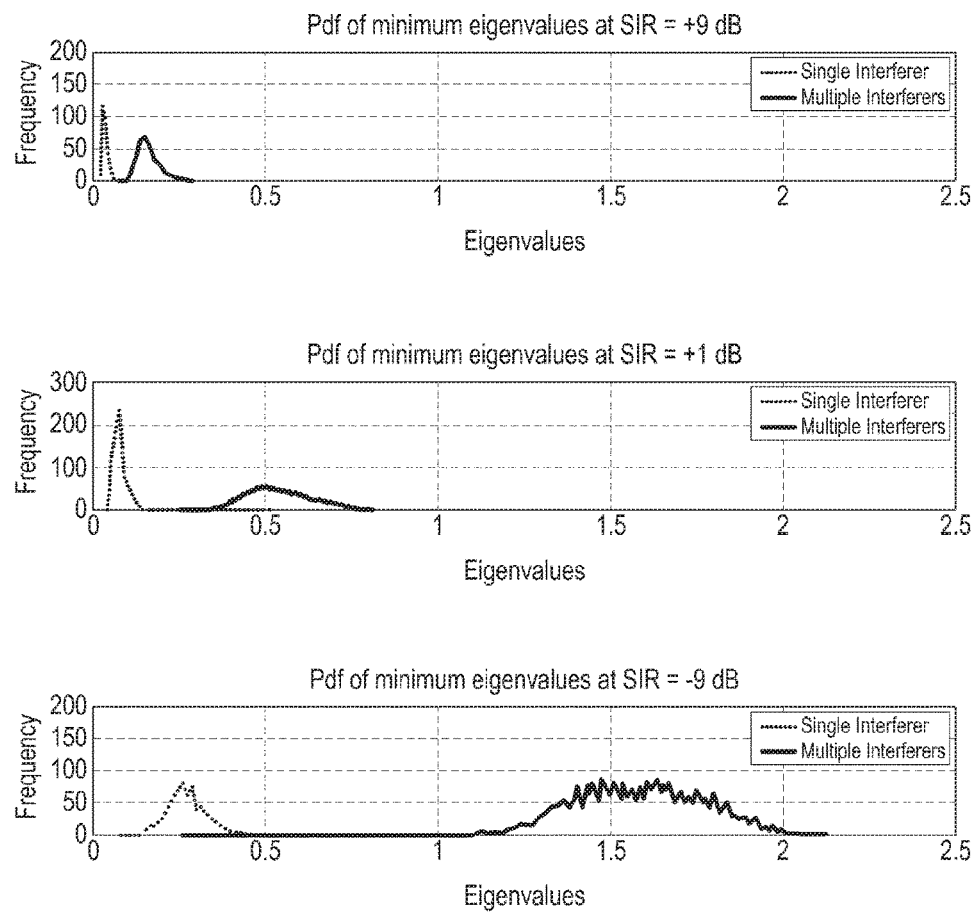
FIG. 3 is a graph illustrating a probability distribution of λmin as SINR varies from +9 dB to −9 dB for single co-channel interferer and multiple co-channel interferers scenarios, according to a related art.

FIG. 3 is a graph illustrating a probability distribution of $\lambda$min as SINR varies from +9 dB to −9 dB for single co-channel interferer and multiple co-channel interferers scenarios, according a related art.

Figure 4:
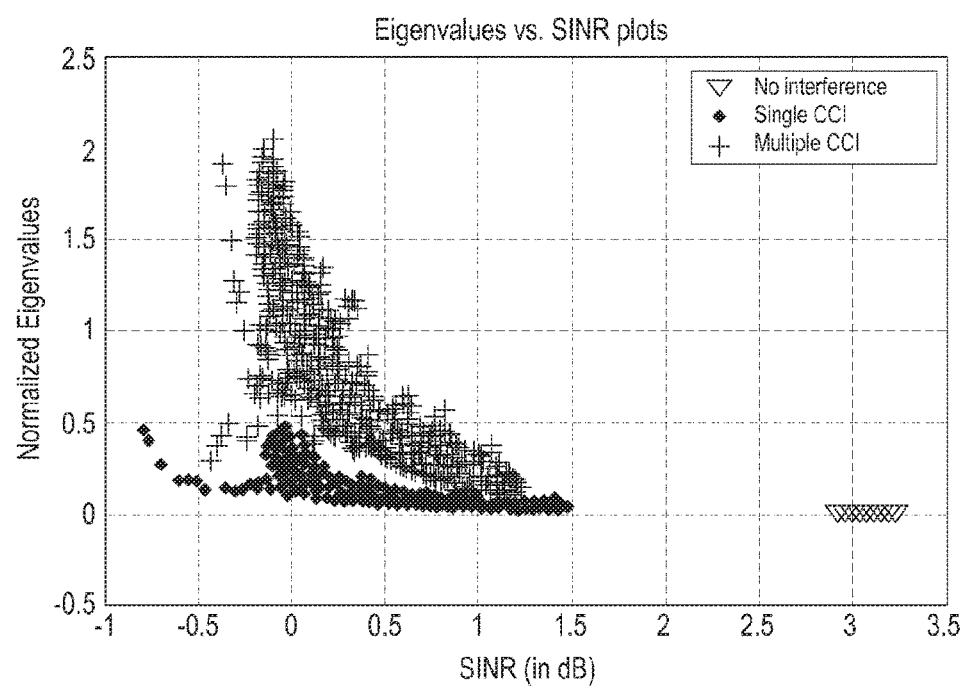
FIG. 4 is a graph illustrating the SINR versus eigenvalues for different numbers of interferers, according to a related art.

FIG. 4 shows that the PDF of the minimum eigenvalue $\lambda_{min}$ drifts as the SINR varies. As SINR increases, demarcation between single CCI and multiple CCI case (two CCI's in this case) becomes unclear.

In FIG. 4, eigenvalues are plotted against the variation in the SINR for three scenarios: no CCI case, a single CCI case, and a multiple CCI case.

Figure 5:
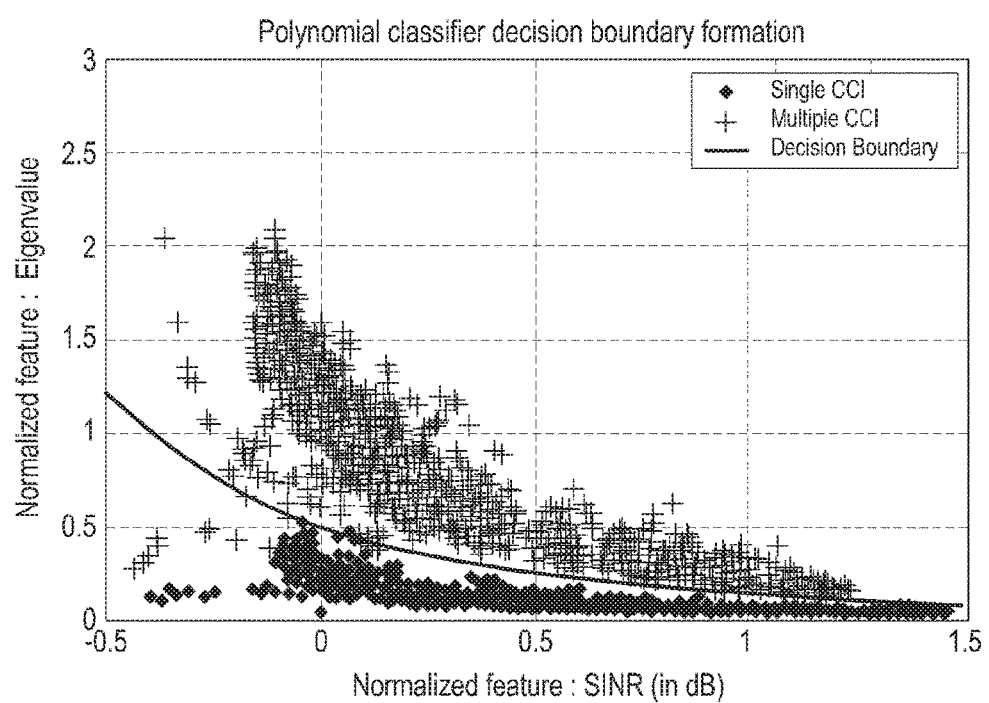
FIG. 5 is a graph illustrating a decision boundary found by a non-linear polynomial classifier scheme, according to an example embodiment.

Referring to FIG. 5, a linear (or straight line) classifier based on a single threshold may not be able to distinguish between single CCI and multiple CCI scenario because the variation of eigenvalues ($\lambda\_min$) is a non-linear function of the SINR. Further, the gap between clusters of eigenvalue for single CCI and multiple CCI case decreases as SINR increases. Thus, a non-linear polynomial classifier may be desired.

Polynomial classifier: The polynomial classifier may be driven from the eigenvalues ($\lambda_{min}$) and the SINR. For making classification more accurate, the proposed method may incorporate a higher order combinations of inputs (e.g., $\lambda_{min}^N$, $SINR^N$ and $(\lambda_{min}*SINR)^N$), where N is a desired order of the polynomial classifier to be constructed.

A regularized logistic regression polynomial classifier equation may be expressed by:

$$J(\theta) = \frac{1}{m}\sum_{i=1}^{m}[-y^{(i)}\log(h_\theta(x^{(i)})) - (1 - y^{(i)})\log(1 - h_\theta(x^{(i)}))] + \frac{\mu}{2m}\sum_{j=1}^{n}\theta_j^2 \quad (25)$$

where $\theta$ represents parameters or weights to be learned, $J(\theta)$ is a cost function and $h_\theta(x^{(i)})$ denotes the hypothesis function. The hypothesis function may be expressed by $$h_\theta(x) = g(\theta^T x) \quad (26)$$

where function g is the sigmoid function. The sigmoid function is defined as:

$$g(z) = \frac{1}{1+e^{-z}} \quad (27)$$

where x is the training matrix, and μ is the regularization parameter. Also, $x^{(i)}$ denotes the $i^{th}$ set of "input" variables to the logistic regression classifier, and $y^{(i)}$ denotes the $i^{th}$ "output" or target value. The number of examples in the training set for the classifier is denoted by m. $\{(x^{(i)}, y^{(i)}); i=1, 2, \ldots, m\}$ is called training set where a pair $(x^{(i)}, y^{(i)})$ is called the $i^{th}$ training example.

Design of a Simple Polynomial Classifier:

Step 1: Collect input parameters (e.g., $\lambda_{min}$) and SINR from simulation or from a target communication device.

Step 2: Design the cost function J(θ) as in equation (25) using the normalized input parameters (e.g., $\lambda_{min}$) and the SINR and combinations of their higher orders as per desired degree N of the polynomial classifier.

Step 3: Estimate the parameters θ of the hypothesis $h_\theta(x)$ for which the cost function J(θ) reaches its global minimum.

Step 4: Use the estimated parameters θ to calculate hypothesis $h_\theta(x)$ for inputs $\lambda_{min}$ and SINR and combinations of their higher orders. The order of hypothesis filter $h_\theta(x)$ depends on the degree of polynomials, (e.g., N).

Step 5: The filter output θ may lie between 0 and 1 considering normalized inputs.

Step 6: A suitable threshold Thresh equal to 0.5 can then be used to distinguish between single CCI and multiple CCI scenarios. If $h_\theta(x)<0.5$, then scenario is a single co-channel interferer, else If $h_\theta(x) \geq 0.5$, then scenario is a multiple co-channel interferers scenario.

Smoothing of the classifier inputs: instantaneous values of parameters $\lambda_{min}$ and SINR may include noise due to estimation errors and may have huge variations across bursts. Therefore, a simple filtering may be desired to smooth the variations. The filter may be as simple as a single tap IIR filter. When the time index is n, and $\lambda_{min}$ and SINR are instantaneous value, the IIR filtering can be represented by below equations.

$$\lambda_{min,n} = \alpha * \lambda_{min} + (1-\alpha) * \lambda_{min,n-1} \quad (28)$$

$$SINR_n = \beta * SINR + (1-\alpha) * SINR_{n-1} \quad (29)$$

In equations (28) and (29), the initial values of $\lambda_{min}$ and SINR are assumed to be zero. The filter coefficients α and β can be chosen based on simulation results. In order to track variations properly, the filter may be reset periodically.

Referring to FIG. 5, a light gray color classifier may be used as a decision boundary to differentiate between the single CCI and two CCI case. Cross symbol (+) represents minimum eigenvalues against the changing value of SINR for two CCI case, and dark diamond symbol (♦) represents the same for the single CCI case.

Further, referring to FIG. 5, the accuracy of detecting the single co-channel interferer scenario may vary according to the SNR in the communication system. When the SNR is very low (e.g., noise power is very high), the scenario may be very similar to a multiple co-channel interferers scenario because of reduced correlation and addition of extra noise. As SNR increases (e.g., noise power gradually decreases), the accuracy of detecting the single co-channel interferer may be improved.

Figure 6:
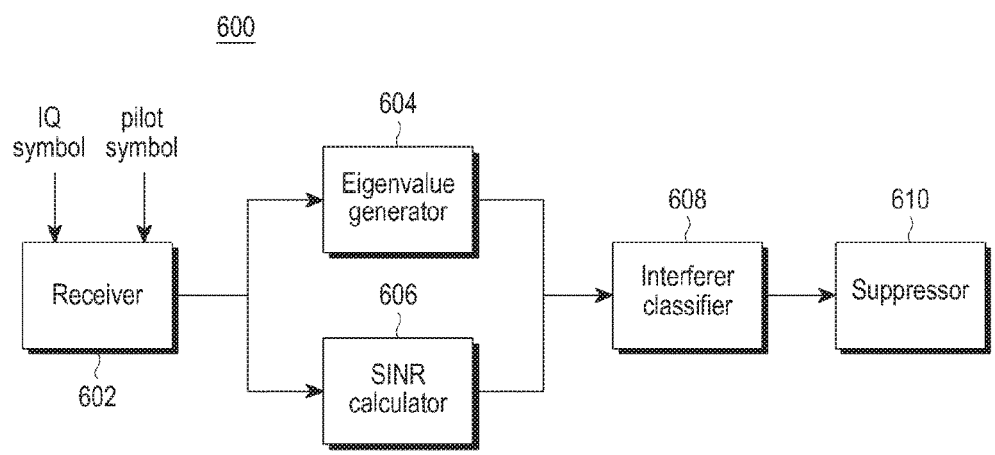
FIG. 6 illustrates various components present in a communication device for classifying interferers in a CCI, according to an example embodiment.

FIG. 6 illustrates various components present in a communication device 600 for classifying one or more interferers in the CCI, according to an example embodiment. The communication device 600 may be, for example but not limited to, a smartphone, a laptop, a desktop, a tablet, a smart watch or the like. The communication device 600 may include a receiver 602, an eigenvalue generator 604, a SINR calculator 606, and an interferer classifier 608, and a suppressor 610. The receiver 602 may be configured to receive the in-phase and quadrature (IQ) symbol and the pilot symbol. The eigenvalue generator 604 may be configured to generate the eigenvalues in accordance with the received IQ symbol and the pilot symbol. The SINR calculator 606 may be configured to compute the SINR from the IQ symbol and the pilot symbol. The interferer classifier 608 may be configured to classify the one or more interferers into one of a single co-channel interferer and multiple co-channel interferer based on the generated eigenvalues and the computed SINR. The suppressor 610 may be configured to suppress the CCI in the communication device 600 based on the classification results from the interferer classifier 608.

In an example embodiment, the eigenvalues may be generated from a mean square error covariance matrix.

In an example embodiment, the interferer classifier 608 may be configured to classify the one or more interferers by normalizing the generated eigenvalues and the computed SINR and designing the cost function based on the normalized eigenvalues and the normalized SINR.

Further, the communication device 600 may be configured to suppress the co-channel interference based on results of the classification, which are received from the interferer classifier 608.

Although FIG. 6 shows example components of the communication device 600, in other implementations, the communication device 600 may include fewer components, different components, differently arranged components, or additional components than depicted in FIG. 6. Further, one or more components of the communication device 600 may perform some of the functions performed by one or more other components of the communication device 600.

Figure 7:
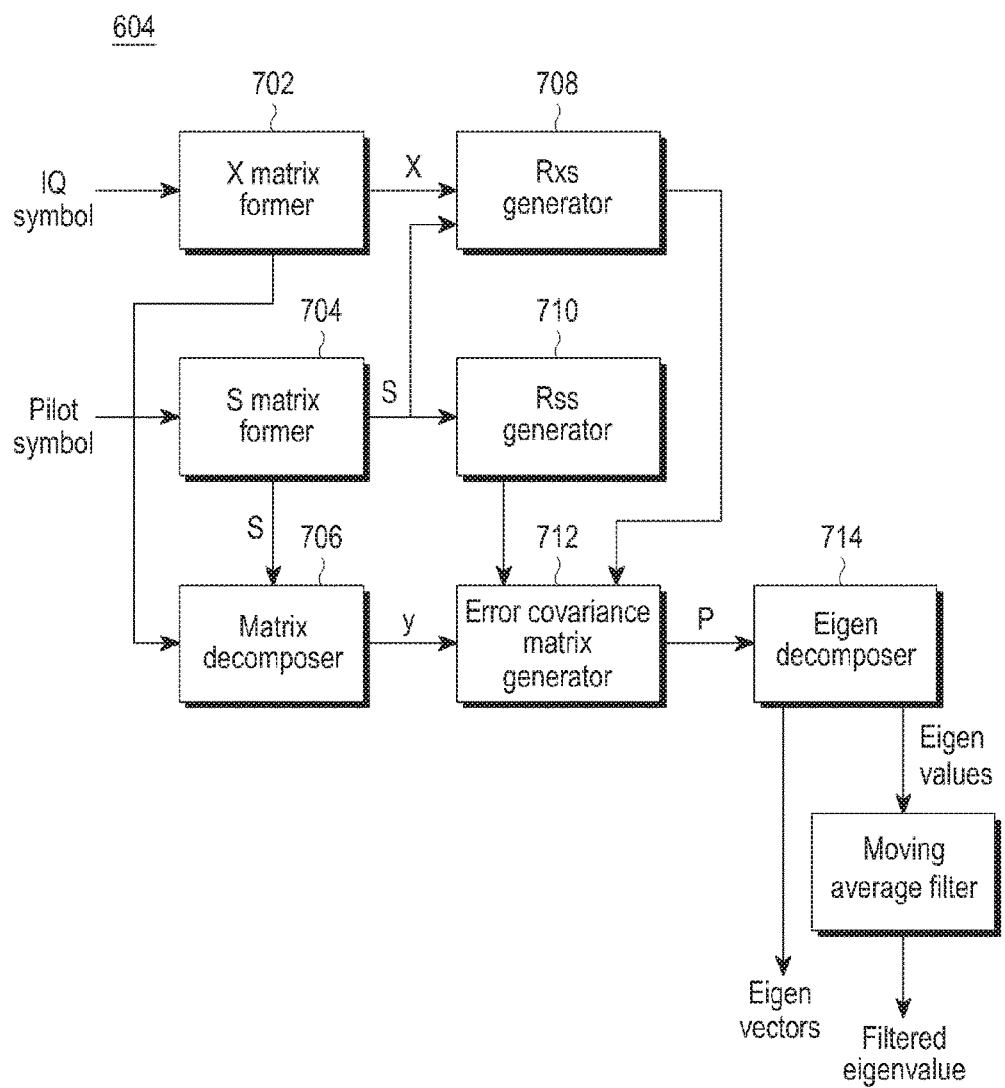
FIG. 7 illustrates various components present in an eigenvalue generator of the communication device, according to an example embodiment.

FIG. 7 illustrates various components present in the eigenvalue generator 604 of the communication device 600, according to an example embodiment. The eigenvalue generator 604 includes an X matrix former 702, an S matrix former 704, a matrix decomposer 706, an Rxs generator 708, an Rss generator 710, an error covariance matrix generator 712 and an Eigen decomposer 714. The received IQ symbols may be fed into the X matrix former 702, and the X matrix former 702 may be configured to generate X matrix by using equation (7). The pilot symbols may be fed into the S matrix former 704, and the S matrix former 704 may be configured to generate S matrix by using equation (8). The generated X and S matrices may be fed into the matrix decomposer 706, and the matrix decomposer 706 may be configured to generate y according to equation (21). Further, the Rxs generator 708 may be configured to generate the cross-correlation $\overline{X}^H\overline{S}$. The Rss generator 710 may be configured to generate the auto-correlation $\overline{S}^H\overline{S}$. The error covariance matrix generator 712 may be configured to generate $\overline{P}$ according to equation (22). The Eigen decomposer 714 may be configured to generate the eigenvalues and Eigen-vectors of $\overline{P}$. The moving average filter may smooth the fluctuation of instantaneous eigenvalues against noise as per equation (28).

Although FIG. 7 shows example components of the eigenvalue generator 604, in other implementations, the eigenvalue generator 604 may include fewer components, different components, differently arranged components, or additional components than FIG. 7. Further, one or more components of the eigenvalue generator 604 may perform some of the functions performed by one or more other components of the eigenvalue generator 604.

Figure 8:
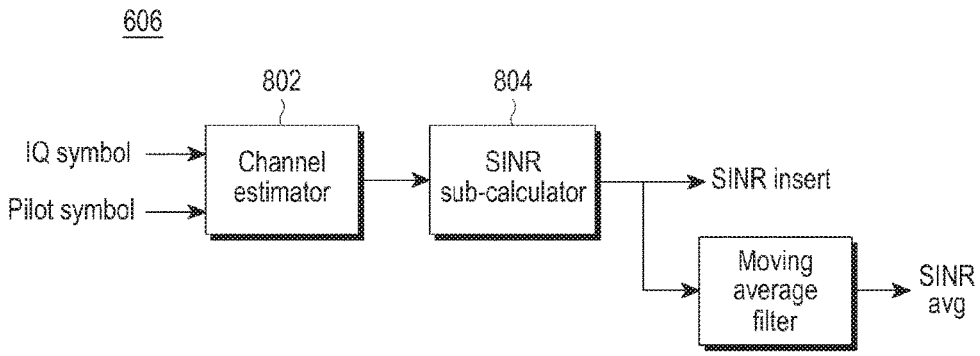
FIG. 8 illustrates various components present in a SINR calculator of the communication device, according to an example embodiment.

FIG. 8 illustrates various components present in the SINR calculator 606 of the communication device 600, according to an example embodiment. The SINR calculator 606 may include a channel estimator 802 and a SINR sub-calculator 804. The received IQ symbols and the pilot symbols may be fed into the channel estimator 802. The channel estimator 802 may be configured to estimate the channel. The estimated channel may be further fed into the SINR sub-calculator 804. The sub-calculator 804 may generate SINR. The moving average filter may smooth the fluctuations of the generated SINR against noise as per equation (29).

$$SINR_n = \beta \cdot SINR + (1-\alpha) \cdot SINR_{n-1} \qquad (29)$$

Although FIG. 8 shows example components of the SINR calculator 606, in other implementations, the SINR calculator 606 may include fewer components, different components, differently arranged components, or additional components than FIG. 8. For example, one or more components of the SINR calculator 606 may perform some of functions performed by one or more other components of the SINR calculator 606.

Figure 9:
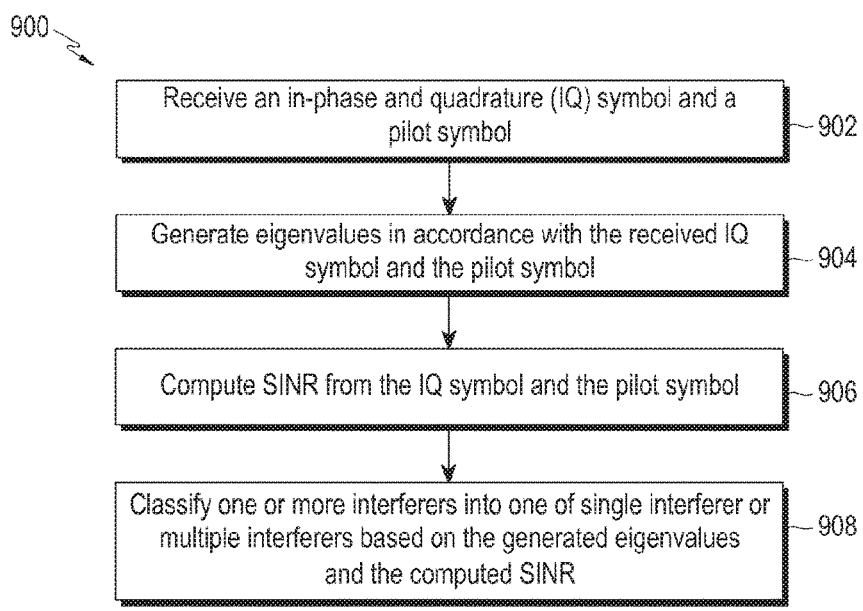
FIG. 9 is a flow chart illustrating a method for classifying interferers in the CCI, according to an example embodiment.

FIG. 9 is a flow chart 900 illustrating a method for classifying interferers in the CCI, according to an example embodiment. At step 902, the IQ symbol and the pilot symbol may be received. For example, the receiver 602 illustrated in FIG. 6 may be configured to receive the IQ symbol and the pilot symbol. At step 904, the eigenvalues may be generated in accordance with the received IQ symbol and the pilot symbol. For example, the eigenvalue generator 604 illustrated in FIG. 6 may be configured to generate the eigenvalues in accordance with the received IQ symbol and the pilot symbol. At step 906, the SINR may be computed from the IQ symbol and the pilot symbol. For example, the SINR calculator 606 illustrated in FIG. 6 may be configured to compute the SINR from the IQ symbol and the pilot symbol. At step 908, the one or more interferers may be classified into one of a single interferer or multiple interferers based on the generated eigenvalues and the computed SINR. For example, the interferer classifier 608 illustrated in FIG. 6 may be configured to classify the one or more interferers into one of a single interferer or multiple interferers based on the generated eigenvalues and the computed SINR.

The various actions, acts, blocks, steps, and the like in the method may be performed in the order presented, or in a different order or simultaneously. Further, in some example embodiments, some actions, acts, blocks, steps, and the like may be omitted, added, modified, skipped, and the like without departing from the scope of the inventive concepts.

Figure 10:
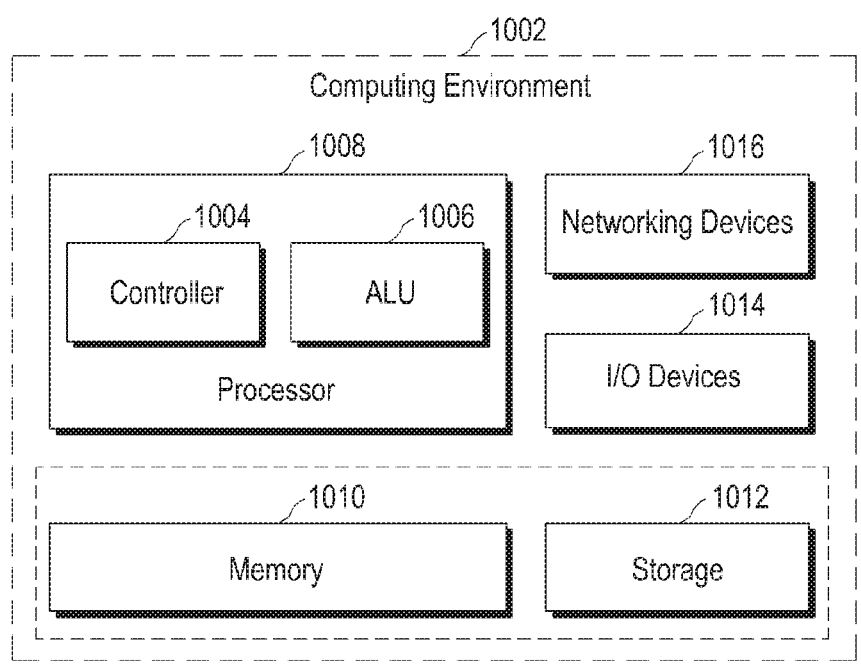
FIG. 10 illustrates a computing environment implementing a mechanism for classifying interferers in the CCI, according to an example embodiment.

FIG. 10 illustrates a computing environment 1002 implementing a mechanism for classifying interferers in the CCI, according to an example embodiment. The computing environment 1002 may include at least one processor 1008, which includes a controller 1004 and an Arithmetic Logic Unit (ALU) 1006, a memory 1010, a storage 1012, a plurality of networking devices 1016, and a plurality of Input/Output (I/O) devices 1014. The processor 1008 may be configured to process the instructions. The processor 1008 may receive commands from the controller 1004 in order to perform its processing. Further, any logical and arithmetic operations involved in the execution of the instructions may be computed by the ALU 1006.

The overall computing environment 1002 may be composed of multiple homogeneous or heterogeneous cores, multiple CPUs of different kinds, special media and other accelerators. The processor 1008 may be configured to process the instructions. Further, the plurality of processors 1008 may be included on a single chip or may be implemented over multiple chips.

Instructions and codes desired may be stored in either the memory 1010, the storage 1012, or both. At the time of execution, the instructions may be fetched from the corresponding memory 1010 or storage 1012, and executed by the processor 1008.

In case of any hardware implementations, various networking devices 1016 or external 110 devices 1014 may be connected to the computing environment 1002 to support the implementation through the networking devices 1016 and the I/O device 1014.

The example embodiments disclosed herein can be implemented through at least one software program running on at least one hardware device and performing network management functions to control the elements. The elements shown in the FIGS. 5 through 10 include blocks which can be at least one of a hardware device, or a combination of hardware device and software module.

The foregoing description of the specific example embodiments will so fully reveal general natures of example embodiments that others can, by applying current knowledge, readily modify and/or adapt for various applications such specific example embodiments without departing from the present inventive concepts. Such adaptations and modifications should be comprehended within the meaning and range of equivalents of example embodiments. It is to be understood that the phraseology or terminology employed herein is for the purpose of description and not of limitation. Therefore, while example embodiments have been described in terms of the specific example embodiments, those skilled in the art will recognize that the specific example embodiments herein can be practiced with modification within the spirit and scope of example embodiments.

What is claimed is:

1. A method of classifying one or more interferers in a co-channel interference (CCI) by a communication device, the method comprising:
   receiving an in-phase and quadrature (IQ) symbol and a pilot symbol;
   generating eigenvalues in accordance with the received IQ symbol and the pilot symbol;
   computing a signal to interference plus noise ratio (SINR) from the IQ symbol and the pilot symbol; and
   classifying the one or more interferers into one of a single interferer or multiple interferers based on the generated eigenvalues and the computed SINR.

2. The method of claim 1, wherein the eigenvalues are generated from a mean square error covariance matrix.

3. The method of claim 1, wherein the classifying the one or more interferers comprises:
   normalizing the generated eigenvalues and the computed SINR; and
   designing a cost function based on normalized eigenvalues and the normalized SINR.

4. The method of claim 1, further comprising:
   suppressing the co-channel interference.

5. A communication device of classifying one or more interferers in a co-channel interference (CCI), the communication device comprising:
   a memory and a storage configured to store instructions; and one or more processors configured to execute the instructions such that the one or more processors are configured to, receive an in-phase and quadrature (IQ) symbol and a pilot symbol, generate eigenvalues in accordance with the received IQ symbol and the pilot symbol, compute a signal to interference plus noise ratio (SINR) from the IQ symbol and the pilot symbol, and classify the one or more interferers into one of a single interferer or multiple interferers based on the generated eigenvalues and the computed SINR.

6. The communication device of claim 5, wherein the eigenvalues are generated from a mean square error covariance matrix.

7. The communication device of claim 5, wherein the one or more processors are further configured to classify the one or more interferers by:

normalizing the generated eigenvalues and the computed SINR; and designing a cost function based on normalized eigenvalues and the normalized SINR.

8. The communication device of claim 5, wherein the one or more processors are further configured to suppress the co-channel interference.

9. A method of adaptively suppressing co-channel interference (CCI) in a communication device, the method comprising:

receiving an in-phase and quadrature (IQ) symbol and a pilot symbol;

generating eigenvalues in accordance with the received IQ symbol and the pilot symbol;

computing a signal to interference plus noise ratio (SINR) from the IQ symbol and the pilot symbol;

classifying one or more interferers into one of a single interferer or multiple interferers based on the generated eigenvalues and the computed SINR; and suppressing the CCI.

10. The method of claim 9, wherein the eigenvalues are generated from a mean square error covariance matrix.

11. The method of claim 9, wherein the classifying the one or more interferers comprises:

normalizing the generated eigenvalues and the computed SINR; and designing a cost function based on normalized eigenvalues and the normalized SINR.

12. The method of claim 9, wherein the generating the eigenvalues comprises:

generating an error covariance matrix;

generating the eigenvalues and eigen-vectors based on the error covariance matrix; and smoothing fluctuation of the eigenvalues against noise.).

13. The method of claim 12, wherein the generating the eigenvalues further comprises:

forming an X matrix based on the received IQ symbol;
forming an S matrix based on the received pilot symbol;
generating a decomposition value by decomposing the X matrix and the S matrix;

generating a cross-correlation based on the X matrix and the S matrix; and generating an auto-correlation based on the S matrix, wherein the generating an error covariance matrix is based on the cross-correlation, the auto-correlation, and the decomposition value.

14. The method of claim 9, wherein the computing the SINR comprises:

estimating a channel based on the received IQ symbol and the received pilot symbol;

generating the SINR based on the estimated channel; and
smoothing fluctuations of the SINR against noise.

15. The method of claim 1, wherein the generating the eigenvalues comprises:

generating an error covariance matrix;

generating the eigenvalues and Eigen-vectors based on the error covariance matrix; and smoothing fluctuation of the eigenvalues against noise.).

16. The method of claim 15, wherein the generating the eigenvalues further comprises:

forming an X matrix based on the received IQ symbol;
forming an S matrix based on the received pilot symbol;
generating a decomposition value by decomposing the X matrix and the S matrix;

generating a cross-correlation based on the X matrix and the S matrix; and generating an auto-correlation based on the S matrix, wherein the generating an error covariance matrix is based on the cross-correlation, the auto-correlation, and the decomposition value.

17. The method of claim 1, wherein the computing the SINR comprises:

estimating a channel based on the received IQ symbol and the received pilot symbol;

generating the SINR based on the estimated channel; and
smoothing fluctuations of the SINR against noise.

18. The communication device of claim 5, wherein the one or more processors are further configured to:

form an X matrix based on the received IQ symbol;
form an S matrix based on the received pilot symbol;
generate a decomposition value by decomposing the X matrix and the S matrix;

generate a cross-correlation based on the X matrix and the S matrix; and generate an auto-correlation based on the S matrix.

19. The communication device of claim 5, wherein the one or more processor are further configured to:

estimate a channel based on the received IQ symbol and the received pilot symbol; and generate the SINR based on the estimated channel.

20. The communication device of claim 18, wherein the one or more processor are further configured to:

generate an error covariance matrix based on the cross-correlation, the auto-correlation and the decomposition value; and generate the eigenvalues and eigen-vectors based on the error covariance matrix.

* * * * *